(12) United States Patent
Shadwell

(10) Patent No.: US 9,709,339 B2
(45) Date of Patent: Jul. 18, 2017

(54) FINNED HEAT SINK DEVICE WITH MAGNETIC COUPLING TO REMOVE HEAT FROM A MEMBRANCE ROOF AFTER INDUCTION HEATING

(71) Applicant: Peter J. Shadwell, Longmeadow, MA (US)

(72) Inventor: Peter J. Shadwell, Longmeadow, MA (US)

(73) Assignee: Handy & Harman, White Plains, NY (US)

( * ) Notice: Subject to any disclaimer, the term of this patent is extended or adjusted under 35 U.S.C. 154(b) by 376 days.

(21) Appl. No.: 13/741,471

(22) Filed: Jan. 15, 2013

(65) Prior Publication Data

US 2014/0196844 A1 Jul. 17, 2014

(51) Int. Cl.
| | | |
|---|---|---|
| F28F 1/00 | (2006.01) | |
| F28F 3/02 | (2006.01) | |
| C09J 5/06 | (2006.01) | |
| E04D 15/04 | (2006.01) | |

(52) U.S. Cl.
CPC ........ *F28F 3/02* (2013.01); *C09J 5/06* (2013.01); *E04D 15/04* (2013.01); *C09J 2205/31* (2013.01); *C09J 2400/163* (2013.01); *E04D 2015/042* (2013.01)

(58) Field of Classification Search
CPC . H01L 23/3672; H01L 23/467; H01L 23/427; F28F 3/02; C09J 5/06
USPC .......................... 165/80.3, 185; 13/80.3, 185
See application file for complete search history.

(56) References Cited

U.S. PATENT DOCUMENTS

| | | | |
|---|---|---|---|
| 4,733,293 A | | 3/1988 | Gabuzda |
| 5,233,248 A | * | 8/1993 | Kawamura ............ H02K 1/185 310/156.25 |
| 5,307,037 A | * | 4/1994 | Woods et al. ................. 335/216 |
| 5,736,798 A | * | 4/1998 | O'Brien et al. ................. 310/51 |
| 6,831,541 B1 | * | 12/2004 | Seidler .......................... 335/306 |
| 6,983,789 B2 | | 1/2006 | Jenkins |
| 7,273,090 B2 | * | 9/2007 | Crocker et al. .......... 165/104.33 |
| 7,387,503 B2 | * | 6/2008 | Toda et al. .................... 418/55.1 |
| 7,399,949 B2 | | 7/2008 | Barber et al. |
| 7,587,786 B2 | * | 9/2009 | Zahuranec .............. A47L 5/225 15/329 |
| 8,333,521 B2 | | 12/2012 | Viglione |

(Continued)

FOREIGN PATENT DOCUMENTS

DE    4022607 A1 *  1/1992  .......... B23Q 3/1546

OTHER PUBLICATIONS

DE 4022607 A1 machine translation.*

(Continued)

*Primary Examiner* — Len Tran
*Assistant Examiner* — Gordon Jones
(74) *Attorney, Agent, or Firm* — Alix, Yale & Ristas, LLP

(57) ABSTRACT

A magnetic heat sink device and a heat removal method employs a heat sink device having a base assembly and a handle which extends in upright fashion from the base assembly. The base assembly has an array of fins. Magnets are received in holders of the base assembly and are magnetically bondable to an underlying metal attachment member so that the array of fins is in thermal communication with the member. Heat in the vicinity of the member is conducted to the fins and dissipated from the fins into the ambient environment.

7 Claims, 5 Drawing Sheets

(56) References Cited

U.S. PATENT DOCUMENTS

| | | |
|---|---|---|
| 2005/0073814 A1 | 4/2005 | Tillotson |
| 2012/0080699 A1* | 4/2012 | Chowdhury et al. ........... 257/98 |
| 2012/0120608 A1* | 5/2012 | Guan ............................ 361/704 |

OTHER PUBLICATIONS

Development of a novel printed circuit board technology for inductive device applications; O. Dezuari, S.E. Gilbert, E. Belloy, M.A.M. Gijs ; Institute of Microsystems, Swiss Federal Institute of Technology (EPFL), CH-.*

* cited by examiner

FINNED HEAT SINK DEVICE WITH MAGNETIC COUPLING TO REMOVE HEAT FROM A MEMBRANCE ROOF AFTER INDUCTION HEATING

BACKGROUND

The present disclosure relates generally to methods and devices for attaching material to roofs. More particularly, the present disclosure relates to methods and devices for the securement of a membrane which overlies sheets of thermal insulation secured to a roof substrate by use of attachment discs.

In roof construction technology for which the present disclosure has specific application, sheets of thermal insulation are secured to the top of a roof structure by metallic attachment or compression discs. The members are placed on the top of the insulation and typically secured via a fastener to the substrate portion of the roof in a grid-like array. Stand-up installation tools which automatically feed plates and drive fasteners may also be used. The upper surfaces of the metallic members are affixed with a heat activated adhesive that becomes active by heating the discs. A water impervious membrane is laid over the insulation and the discs. The bottom surface of the membrane is bonded to the members by the adhesive.

There are several types of induction heating devices which are conventionally employed to heat the member and activate the adhesive. Such devices are moved across the membrane and positioned over the underlying disc. An induction heating coil interacts with the metallic member to set up a magnetic field with the member and to ultimately heat the attachment member and thereby activate the adhesive.

U.S. Pat. No. 7,399,949 discloses a heating apparatus employed for attaching membrane material to attachment members that hold sheets of thermal insulation at the top of a roof substrate. The heating apparatus emits a magnetic field that raises the temperature of the member and activates the heat activated adhesive disposed on the top of the disc. The heating apparatus includes a set of bottom guides to allow a user to find the attachment members mechanically without actually seeing the member beneath the top membrane layer. A fine locator circuit employs a magnetic field to locate the disc. The apparatus allows a user to stand upright on the membrane while operating the apparatus. Upon cooling, the adhesive becomes adhered to the bottom surface of the top membrane layer.

SUMMARY

Briefly stated a magnetic heat sink device for removing heat from a metallic heated attachment member affixed with heat activated adhesive generally comprises a base assembly and a handle extending in upright fashion from the base assembly. The base assembly has a base which has a periphery disposed radially outwardly from a longitudinal axis. Holders in the form of sockets are defined adjacent the periphery of the base, and magnets are received in the sockets such that the magnets are positioned adjacent a baseplate having a bottom surface. An array of fins in thermal communication with the base forms a heat path so that heat is dissipated from the fins into the ambient environment.

In one preferred embodiment, the base assembly is generally symmetric about the longitudinal axis, and the handle extends from the base assembly in a direction generally parallel with the longitudinal axis. The array of fins is generally symmetric about the longitudinal axis. The handle is preferably coaxial with the longitudinal axis.

The array of fins preferably comprises a first set of fins and an alternating second set of fins. The first set of fins comprises equiangularly spaced fins that taper from a lower portion to an upper portion generally convergent toward the handle. The second set of fins comprises equiangularly spaced fins having a smaller surface area in comparison with the first set of fins. The array of fins in one embodiment is composed of heat conductive plastic material.

The magnetic heat sink device employs the magnets to magnetically bond with the metal member or attachment member. The base assembly is located in close proximity to the attachment member. An array of fins is in thermal communication with the base assembly so that heat in the vicinity of the attachment member is conducted to the fins and dissipated therefrom into the ambient environment.

A method of attaching a membrane to an underlying upper surface of a metallic attachment member having a heat activated adhesive comprises heating the member via an induction tool positioned above the membrane and member. The attachment member is heated by the inductive tool to activate the adhesive. The inductive tool is removed from the vicinity of the attachment member. A heat sink device is positioned over the attachment member. The heat sink device is magnetically bonded to the attachment member and heat is removed from the member through the device into the ambient environment.

A thermal path is established between the attachment member and an array of fins on the heat sink device. In a preferred method, magnetic bonds are established between the heat sink device and the attachment member. The step of positioning the heat sink device further comprises using a handle to magnetically position the heat sink device. The heat sink device is preferably substantially centered relative to the member.

DETAILED DESCRIPTION

With reference to the drawings wherein like numerals represent like parts throughout the several figures, a magnetic heat sink device is generally designated by the numeral 10. The magnetic heat sink device 10 is a hand held device which is adapted to magnetically bond with an insulation attachment member and to function as a heat sink which pulls heat from the member in a highly efficient manner. The magnetic heat sink 10 is relatively lightweight, allowing a user to easily manipulate and position the magnetic heat sink 10. In addition to its easily manipulable dimensions, the favorable heat dissipating features of the magnetic heat sink 10 cause the overlying membrane to bond to the member in an accelerated fashion.

Figure 1:
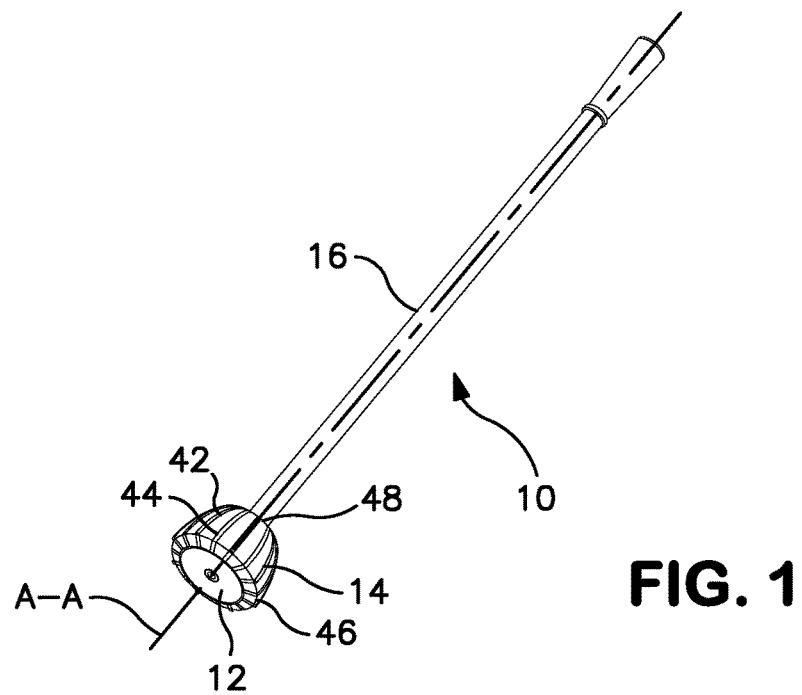
FIG. 1 is a perspective view of one embodiment of a magnetic heat sink device.
Figure 2:
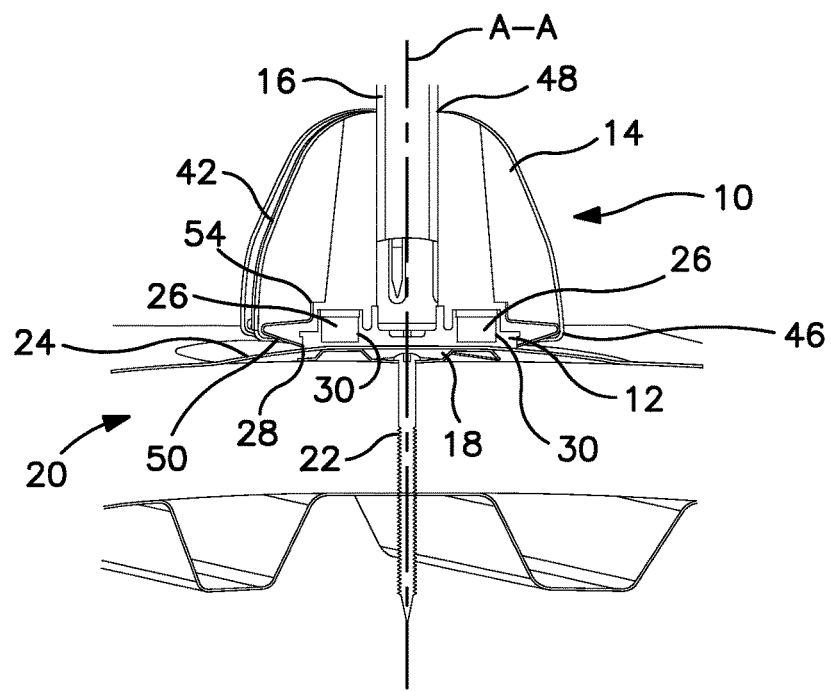
FIG. 2 is a cross-sectional view of the base assembly of the embodiment of the heat sink device of FIG. 1, a segment of a roof, insulation, a metallic attachment member, threaded fastener, and water impervious membrane also being depicted in cross-section.

Referring to FIGS. 1 and 2, the heat sink device 10 generally comprises a base assembly 11 having a base 12 and an array of fins 14, and a handle 16. The heat sink device 10 has a longitudinal axis A-A, as shown in FIG. 1.

As shown in FIG. 2, the heat sink device 10 is designed for use with a metallic attachment member 18, such as a compression disc or plate, employed in roof construction. As will be discussed in greater detail below, after a fastener 22 secures the attachment member 18 to the roof 20, an induction heating apparatus (not shown) melts an adhesive (not shown) on the surface of the member 18, and activates the adhesive, thereby bonding with the underside of a water impervious membrane 24. The heat sink device 10 is then moved to a position over the attachment member 18 so that the base assembly 11 rests on the membrane 24.

Figure 3:
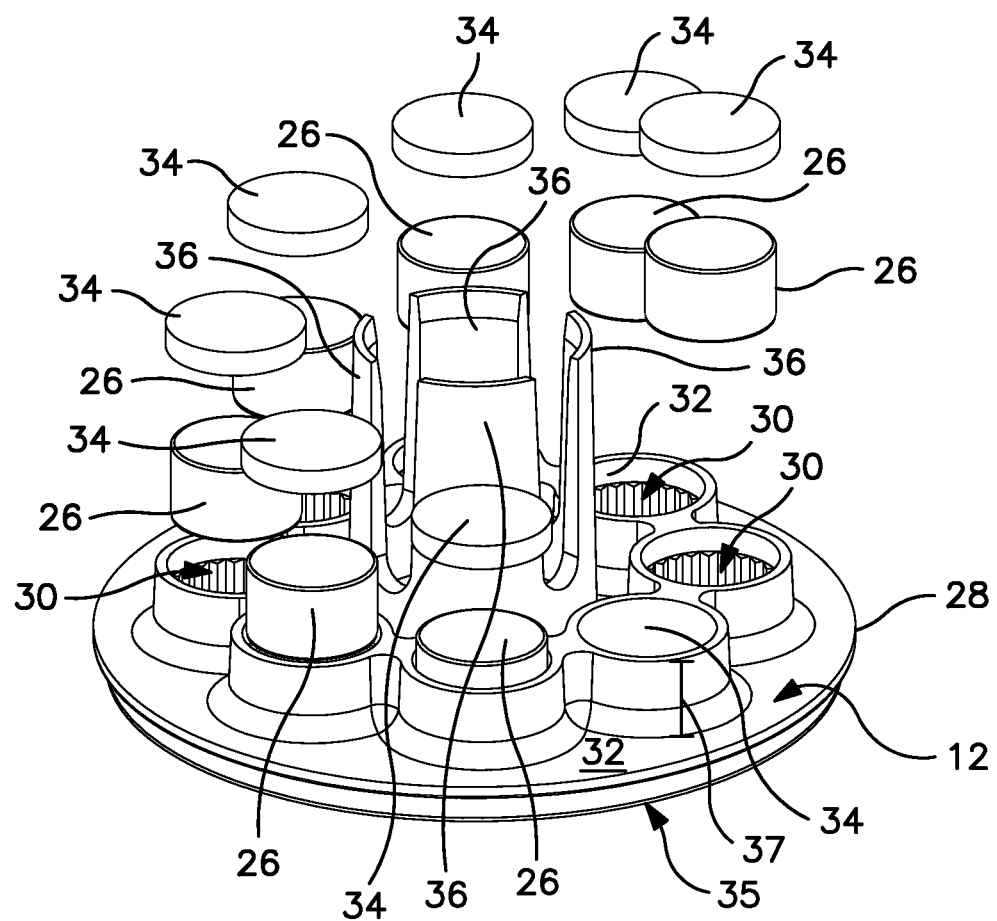
FIG. 3 is a partially exploded view of an embodiment of the base and plurality of magnets, the array of fins and the handle being omitted for clarity.
Figure 7:
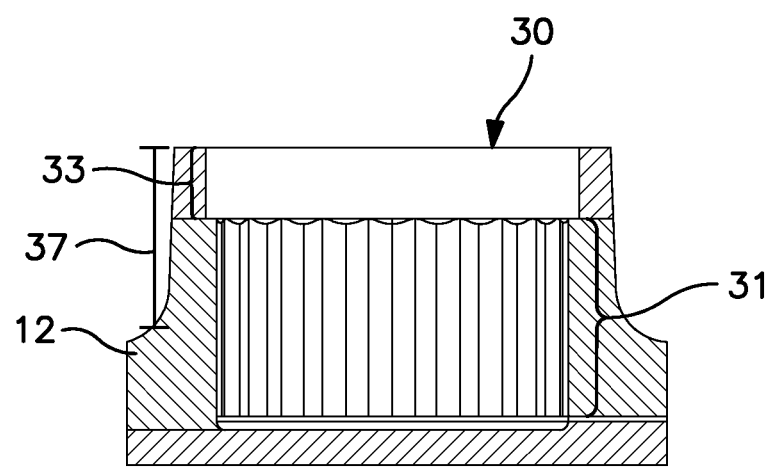
FIG. 7 is an enlarged cross-sectional view of one of the plurality of holders of the base shown in FIGS. 3 and 4.

As seen in FIGS. 2, 3 and 7, the base 12 carries a plurality of magnets 26, which form a magnetic bond with the member 18. The base 12 has a lower baseplate 13. The base 12 has a periphery 28 which is disposed radially outwardly from the longitudinal axis A-A. A plurality of holders in the form of generally cylindrical sockets 30 which are sized to receive the magnets 26, are defined adjacent the periphery 28. As shown in FIG. 3, the sockets 30 may be slightly raised from the surface of the base 12. In the embodiment shown in FIGS. 3 and 4, the base 12 has a generally circular periphery, and the sockets 30 are arranged concentrically about the longitudinal axis A-A.

Figure 4:
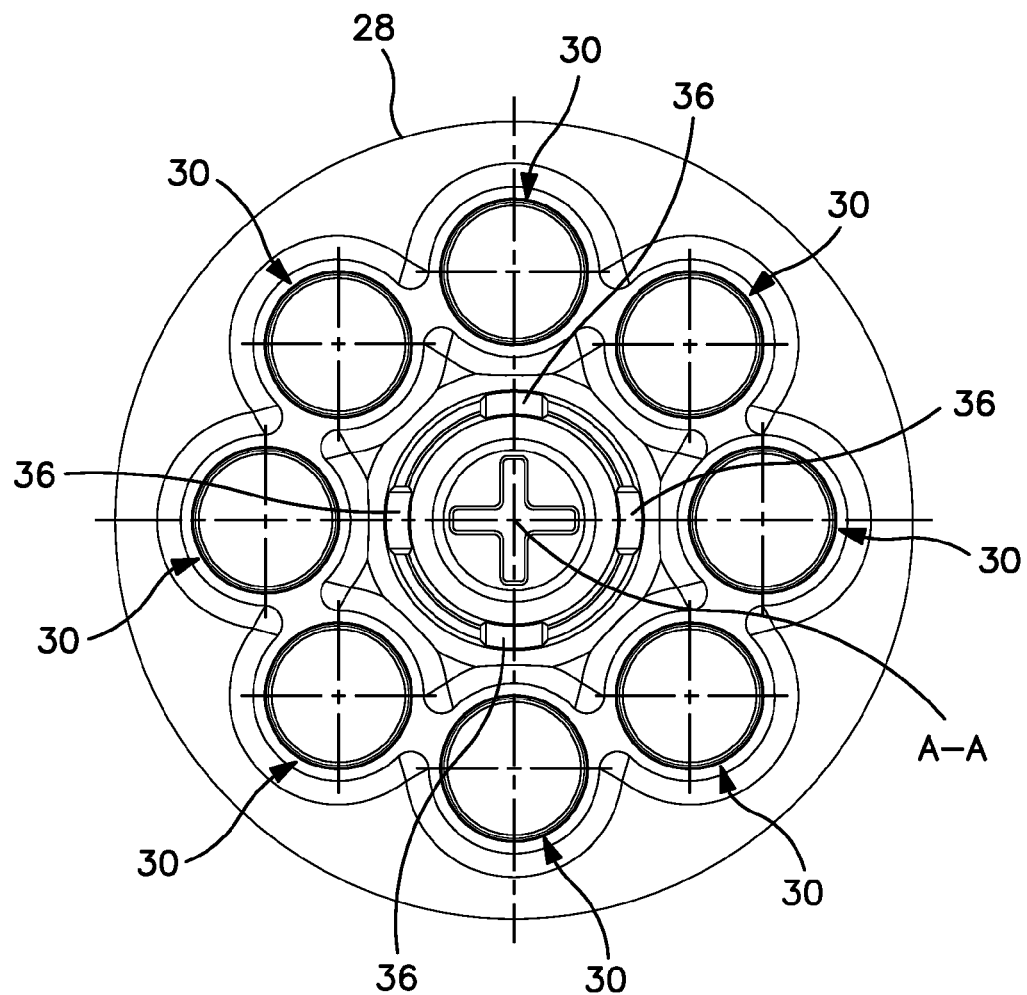
FIG. 4 is a top plan view of the base of FIG. 3.

In one embodiment shown in FIGS. 3 and 7, the magnets 26 and the sockets 30 are cylindrical. The sockets 30 have an interior surface 32 having a first portion 31 and a second portion 33. As best seen in FIG. 7 the first portion 31 may be castellated. The castellated feature functions to minimize contact between the magnets 26 and the base. A plurality of inserts 34 (FIG. 3) also cooperate with the socket 30 to retain the magnets 26. The inserts 34 envelop the top and sides of the magnets, and engage the interior second portion 33, forming a press-fit connection, as shown in FIGS. 3 and 4. The inserts 34 tend to thermally isolate the top surfaces of the magnets. Other structures may be employed to thermally isolate the magnets or minimize thermal conduction between the base and the magnets. As shown in FIGS. 3 and 7, the sockets 30 may also have a socket wall 37 which projects above an upper surface 39 of the base 12.

Referring to FIGS. 1-4, the handle 16 extends in an upright fashion from the base assembly 11. In one embodiment best seen in FIGS. 3 and 4, the base 12 may have a plurality of resilient arms 36. The arms 36 define a handle retention pocket 38 coaxial with the longitudinal axis A-A. The pocket 38 is configured to retain the handle 16 against the base assembly 11. The sockets 30 are circumferentially spaced adjacent the periphery 28 and concentric with the longitudinal axis A-A.

Figure 5:
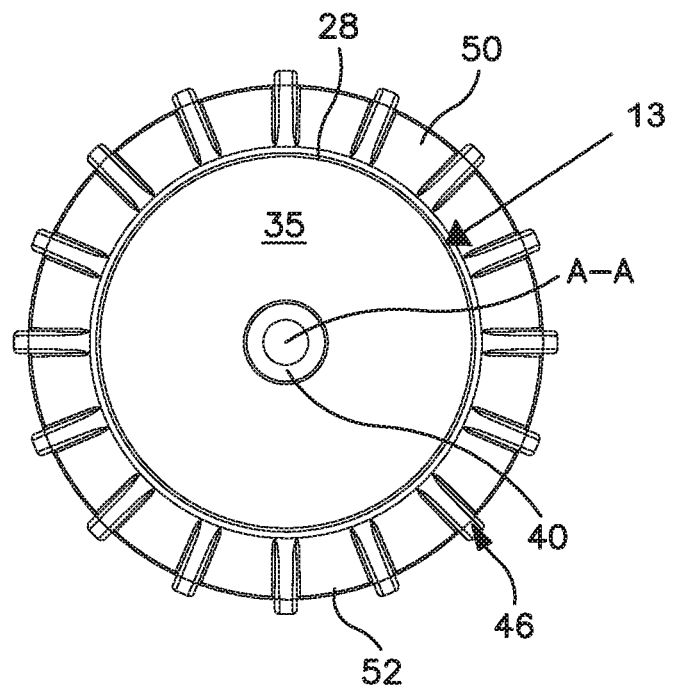
FIG. 5 is a bottom plan view of the base assembly of FIG. 1.

Referring to FIG. 5, the baseplate 13 also has a bottom surface 35 axially proximate to the magnets 26. The bottom surface 35 defines a plane which is oriented perpendicular to the longitudinal axis A-A. The baseplate 13 is constructed of a ferromagnetic material, ensuring that the base 12 is centered over the member 18 when the water impervious membrane is laid on top of the member 18. The ferromagnetic material of the baseplate 13 propagates the magnetic force of the magnets 26, and magnetically bonds the baseplate 13 to the metallic member 18. A flat bottom surface 35 ensures that as much surface area of the base 12 makes intimate contact with the member 18 as possible, to efficiently conduct heat away from the member 18 and into the ambient environment.

In one embodiment shown in FIG. 5, the baseplate 13 is a metal annulus. The metal annulus surrounds a central recess 40. As seen in FIG. 5, the central recess 40 is coaxial with the longitudinal axis A-A. The central recess 40 accommodates any protrusion caused by the fastener head and ensures surface-to-surface contact of the baseplate 13 against the membrane 24.

Figure 6:
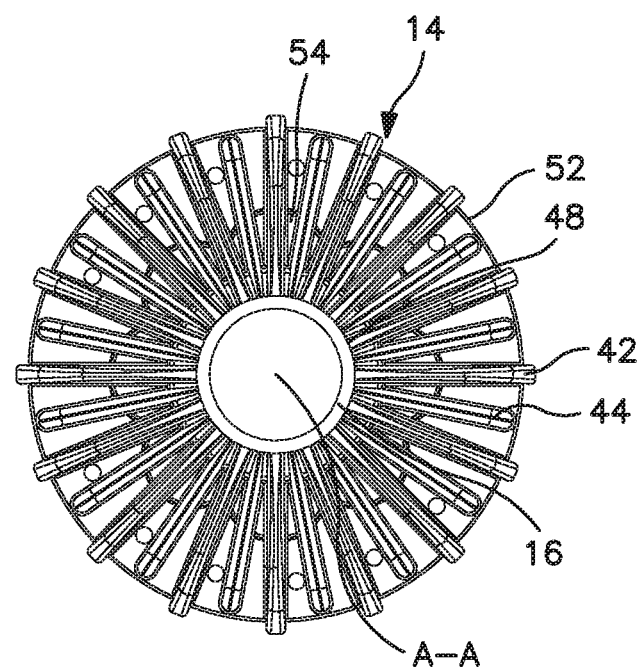
FIG. 6 is a top plan view of the base assembly of FIG. 1, the handle being omitted for clarity.

As shown in FIGS. 1, 2 and 6, the array of fins 14 are arranged in thermal communication with the base 12. Referring specifically to FIG. 2, the array of fins 14 are mounted in thermal communication to the base 12. The array of fins 14 efficiently transfers heat from the base 12 into the ambient environment by presenting a relatively large surface area adjacent the base 12 given the compact dimensions of the base assembly. As seen in FIG. 6, the fins 14 are generally symmetric about the longitudinal axis A-A, and may be equiangularly spaced about the longitudinal axis A-A.

In one embodiment, the fins 14 are composed of a heat conductive plastic material. The fins 14 are integrally molded to the base 12 to ensure that the fins 14 are configured in thermally conductive contact with the base 12, and in particular the metal baseplate 13.

In one embodiment shown in FIGS. 1 and 6, the array of fins 14 comprises two sets of fins, a first set of identical fins 42, and an alternating second set of identical fins 44. The first set of fins 42 comprises a plurality of equiangularly spaced fins of a generally uniform thickness. As shown in FIGS. 1, 2, 5 and 6, the first set of fins 42 preferably taper from a bottom end portion 46 disposed at a periphery 41 of the baseplate 13 to an upper portion 48. The upper portion 48 is generally convergent toward the handle 16.

In one embodiment shown in FIGS. 2 and 5, the array of fins 14 has an interrupted annular portion 50, which extends radially outwardly from the baseplate periphery 41, and flares slightly angularly away from the plane defined by the bottom surface 35 of the baseplate 13. As seen in FIG. 5, the bottom end portion 46 of each fin 42 interrupts the annular portion 50 and is radially inwardly contiguous with the baseplate periphery 41. As seen in FIGS. 2, 5 and 6, each of the fins of the first set 42 projects radially beyond a periphery 52 of the interrupted annular portion 50.

As seen in FIGS. 1 and 6, the second set of fins 44 comprises a plurality of identically angularly spaced fins of a generally uniform thickness. The second set of fins 44 does not extend as far radially from the longitudinal axis A-A as the first set of fins 42, and in one embodiment depicted in FIG. 6, the second set of fins 44 extend radially to the periphery 52 of the interrupted annular portion 50.

As best seen in FIGS. 1, 2 and 6, the second set of fins 44 projects axially from the annular portion 50 to an upper shoulder 56 intermediate the annular portion 50 and the upper portion 48 of the first set of fins 42. In one embodiment best seen in FIGS. 2 and 6, the upper shoulder 56 of the second set of fins 44 is contiguous with an annular shoulder 54 which is sized and configured to envelop the circumferentially arranged sockets 30 and magnets 26 of the base 12 (FIG. 2). The second set of fins 44 are sized to have a much smaller surface area than the first set of fins 42. The dimensions of the first set of fins 42 in comparison with the second set of fins 44 provides an angular array of heat communication channels to the ambient environment for the array of fins 14, and enhances the rate at which the fins 14 conduct heat away from the attachment plate 18.

With reference to FIG. 2, a method of attaching a water impervious membrane 24 to an underlying upper surface of a metallic member having a heat activated adhesive (not shown) is also contemplated. The heat sink device 10 effectively sets the adhesive, and reinforces the bonds between the attachment member 18 and the water impervious membrane 24.

First, an induction heating tool (not shown) is positioned above the membrane 24 and the attachment member 18. After the heat induction tool is removed from the attachment member 18, the heat sink device 10 is positioned over the member 18. A magnetic force created by the magnets 26 is propagated through the baseplate 13 and the heat sink device 10 forms a magnetic bond with the attachment member 18.

The heat sink device 10 is provided with an array of fins 14 configured such that an efficient thermal path is established between the attachment member 18 and the fins 14. The unique arrangement and structure of the fins 14 provide thermal pathways which rapidly cool the attachment member 18 by presenting a relatively large surface area of the device 10 for exposure to the ambient atmosphere, despite the compact dimensions of the base assembly 11. The fins 14 play the key role in radially conducting heat away from the attachment member 18, thereby rapidly curing the adhesive (not shown) and ensuring a strong adhesive bond between the top of the attachment member 18 and the water impervious membrane 24. Severing the temporary magnetic bond between the device 10 and the member 18 has no effect on the integrity of the adhesive bond.

The step of positioning the heat sink device may comprise using a handle to magnetically position the heat sink device 10. For optimal function, the heat sink device 10 is substantially centered relative to the attachment member 18, e.g., the central axis A-A aligns with the central axis of the fastener 22.

While a preferred embodiment has been set forth for purposes of illustration, the foregoing description should not be deemed a limitation of the invention herein. Accordingly, various modifications, adaptations and alternatives may occur to one skilled in the art without departing from the spirit and scope of the invention.

The invention claimed is:

1. A magnetic heat sink device for removing heat from an external insulation metallic member and having a longitudinal axis comprising: a base assembly comprising a plurality of magnets, a base having a central location and a generally circular periphery disposed radially outwardly from the longitudinal axis and defining a plurality of holders sized to receive said magnets and disposed adjacent said periphery, each of said holders being a castellated socket having an axial socket wall which projects axially upwardly from said base, an insert configured to engage an interior surface of said socket wall such that each of said magnets is contained in said socket by said insert, a baseplate of ferromagnetic material having a bottom surface disposed axially proximate at least one of the plurality of magnets whereby said at least one magnet is in magnetic communication with said baseplate, wherein said bottom surface defines a plane oriented generally perpendicular to the longitudinal axis and adapted to magnetically bond with the metallic member, and an array of radially extending fins in thermal communication with said baseplate, and projecting longitudinally upwardly so that heat applied to said baseplate from a member is conducted to said fins and dissipated therefrom into the ambient environment, and a plurality of resilient arms at said central location defining a handle retention pocket coaxial with the longitudinal axis: and a handle extending longitudinally in upright fashion from said handle retention pocket.

2. The magnetic heat sink device of claim 1 wherein said base assembly is generally symmetric about the longitudinal axis and said handle extends from said base assembly in a direction generally parallel with the longitudinal axis.

3. The magnetic heat sink device of claim 1 wherein said array of fins is generally symmetric about the longitudinal axis.

4. The magnetic heat sink device of claim 3 wherein said handle is coaxial with the longitudinal axis.

5. The magnetic heat sink device of claim 1 wherein said array of fins comprises a first set of fins and an alternating second set of fins.

6. The magnetic heat sink device of claim 1 wherein said array of fins is composed of heat conductive plastic material.

7. The magnetic heat sink device of claim 1 wherein said baseplate has a central recess in its bottom surface.

\* \* \* \* \*